(12) United States Patent
Jheeta

(10) Patent No.: US 9,672,827 B1
(45) Date of Patent: Jun. 6, 2017

(54) REAL-TIME CONVERSATION MODEL GENERATION

(71) Applicant: Expect Labs, Inc., San Francisco, CA (US)

(72) Inventor: Moninder Jheeta, Redmond, WA (US)

(73) Assignee: Mindmeld, Inc., San Francisco, CA (US)

(*) Notice: Subject to any disclaimer, the term of this patent is extended or adjusted under 35 U.S.C. 154(b) by 273 days.

(21) Appl. No.: 14/095,849

(22) Filed: Dec. 3, 2013

Related U.S. Application Data

(60) Provisional application No. 61/763,464, filed on Feb. 11, 2013.

(51) Int. Cl.
| | | |
|---|---|---|
| *G10L 15/08* | (2006.01) | |
| *G10L 15/32* | (2013.01) | |
| *G10L 15/18* | (2013.01) | |
| *G10L 15/26* | (2006.01) | |

(52) U.S. Cl.
CPC .............. *G10L 15/32* (2013.01); *G10L 15/08* (2013.01); *G10L 15/1815* (2013.01); *G10L 15/1822* (2013.01); *G10L 15/26* (2013.01)

(58) Field of Classification Search
CPC ..... G10L 15/08; G10L 15/26; G10L 15/1815; G10L 15/1822
USPC ...... 704/9, 251, 257, 270, E15.001, E15.045
See application file for complete search history.

(56) References Cited

U.S. PATENT DOCUMENTS

| | | | | |
|---|---|---|---|---|
| 5,535,063 A | * | 7/1996 | Lamming | G06F 15/025 360/4 |
| 8,001,166 B2 | * | 8/2011 | Toyoshima | G06Q 10/06 705/1.1 |
| 8,055,669 B1 | * | 11/2011 | Singhal | G06F 17/3064 707/765 |
| 8,478,699 B1 | * | 7/2013 | Alfonseca | G06F 17/3064 706/12 |
| 2008/0033924 A1 | * | 2/2008 | Van Luchene | G06Q 30/02 |
| 2008/0033938 A1 | * | 2/2008 | Okamoto | G06F 17/30731 |
| 2008/0147399 A1 | * | 6/2008 | Jaiswal | G10L 15/08 704/251 |
| 2008/0235018 A1 | * | 9/2008 | Eggen | G10L 15/26 704/251 |
| 2009/0048927 A1 | * | 2/2009 | Gross | G06F 17/30867 705/14.42 |

(Continued)

FOREIGN PATENT DOCUMENTS

DE        EP 1462950       *   9/2004

*Primary Examiner* — Pierre-Louis Desir
*Assistant Examiner* — Forrest F Tzeng
(74) *Attorney, Agent, or Firm* — Fenwick & West LLP

(57) ABSTRACT

A conversation model is generated based on a conversation between a plurality of participants. Conversation text associated with the conversation is retrieved. A plurality of conversation model components are identified within the conversation text. A correlation score is determined for each pair of conversation model components representing a measure of relatedness between the pair of conversation model components. Extrapolated conversation model components are identified based on the plurality of conversation model components and the determined correlation scores. The conversation model components, the additional conversation model components, and the correlation scores are then stored as a conversation model.

21 Claims, 8 Drawing Sheets

(56) References Cited

U.S. PATENT DOCUMENTS

| | | | |
|---|---|---|---|
| 2010/0076995 A1* | 3/2010 | Pan | G06F 17/30646 707/770 |
| 2011/0004609 A1* | 1/2011 | Chitiveli | G06F 17/30648 707/759 |
| 2013/0304818 A1* | 11/2013 | Brumleve | H04L 67/02 709/204 |
| 2013/0332450 A1* | 12/2013 | Castelli | G06F 17/278 707/722 |

\* cited by examiner

REAL-TIME CONVERSATION MODEL GENERATION

CROSS REFERENCE TO RELATED APPLICATIONS

The application claims the benefit of Provisional Application No. 61/763,464, filed on Feb. 11, 2013, the content of which is incorporated herein by reference.

BACKGROUND

Field of Disclosure

This disclosure relates to the field of multi-party party communication, and more specifically, to the real-time generation of a conversation model representing communication among multiple participants.

Description of the Related Art

As technological advances allow for greater simultaneous communication capabilities among parties that are not co-located, the need for the real-time analysis of communication data is increasing. Generally, for simultaneous communication (referred to herein as a "conversation"), each participant communicates using a communication device, such as a phone, a computer, a mobile device, and the like. In a typical communication setting, each participant may be located remotely from other participants, and may communicate using a different type of device than other participants. The ability to gather, synchronize, and analyze communication data in such a communication setting is hindered by the remoteness of the participants with respect to each other, and by the lack of a uniform communication device among the participants. In addition, conversations are in constant flux, with changes in topic, varying participation levels, and changes in participants occurring in real-time.

SUMMARY

The above and other issues are addressed by a method, non-transitory computer readable storage medium, and computer system for generating a conversation model between a plurality of conversation participants. An embodiment of the method comprises retrieving conversation text associated with the conversation. A plurality of conversation model components are identified within the conversation text. A correlation score is determined for each pair of conversation model components representing a measure of relatedness between the pair of conversation model components. Additional conversation model components are identified based on the plurality of conversation model components and the determined correlation scores. The conversation model components, the additional conversation model components, and the correlation scores are then stored as a conversation model.

An embodiment of the medium stores executable computer program instructions for generating a conversation model between a plurality of conversation participants. The instructions retrieve conversation text associated with the conversation. A plurality of conversation model components are identified within the conversation text. The instructions determined a correlation score for each pair of conversation model components representing a measure of relatedness between the pair of conversation model components. Additional conversation model components are identified based on the plurality of conversation model components and the determined correlation scores. The instructions store the conversation model components, the additional conversation model components, and the correlation scores as a conversation model.

An embodiment of the computer system for generating a conversation model between a plurality of conversation participants includes a non-transitory computer-readable storage medium storing executable computer program instructions. The instructions retrieve conversation text associated with the conversation. A plurality of conversation model components are identified within the conversation text. The instructions determined a correlation score for each pair of conversation model components representing a measure of relatedness between the pair of conversation model components. Additional conversation model components are identified based on the plurality of conversation model components and the determined correlation scores. The instructions store the conversation model components, the additional conversation model components, and the correlation scores as a conversation model. The computer system also includes a processor for executing the computer program instructions.

DETAILED DESCRIPTION

The Figures (Figs.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
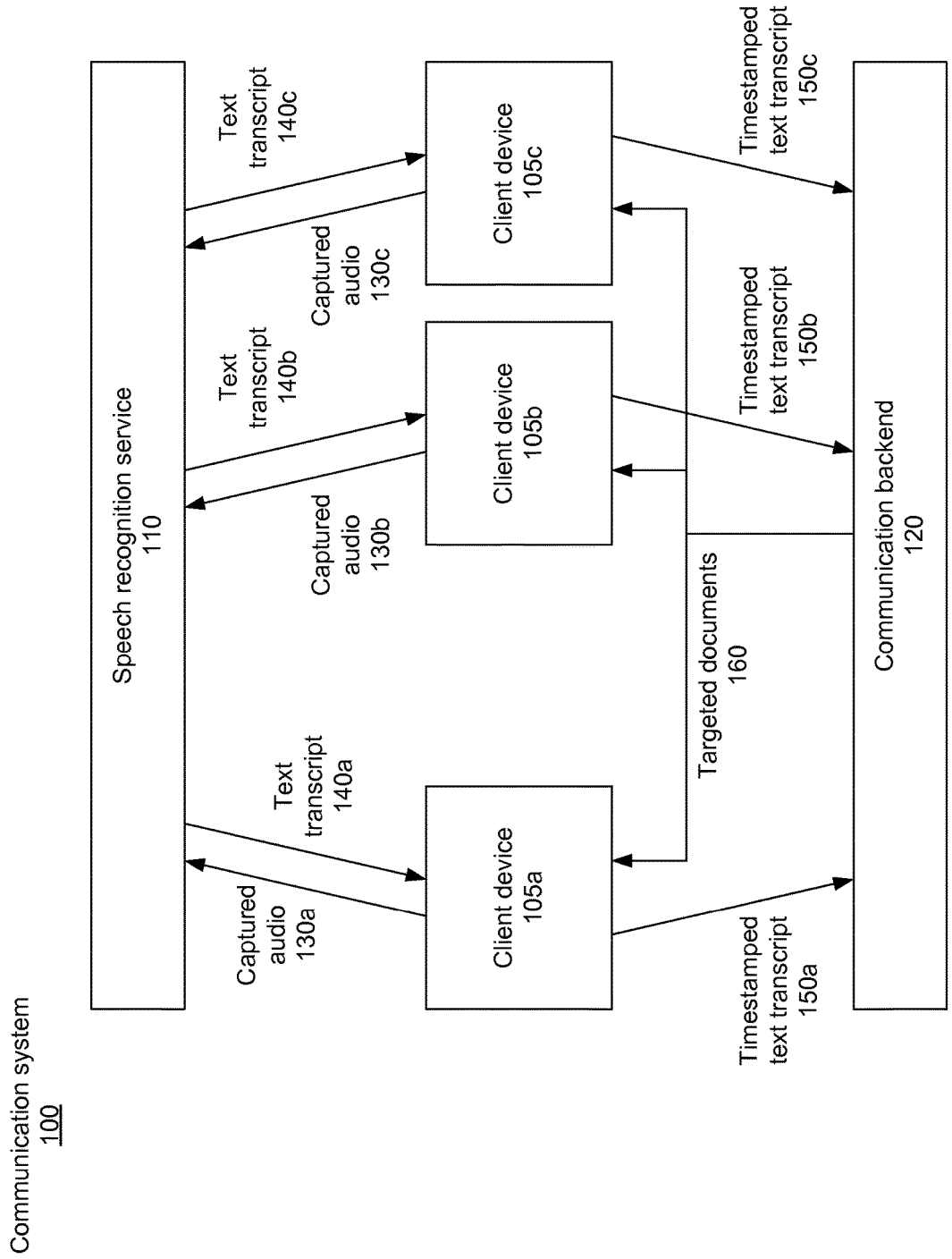
FIG. 1 is a high-level block diagram illustrating the operation of a multi-party communication synchronization system, according to one embodiment.

FIG. 1 is a high-level block diagram illustrating the operation of a multi-party communication synchronization system 100 (hereinafter "communication system 100"), according to one embodiment. FIG. 1 and the other figures describe the operation of the communication system 100 in the context of the capture and synchronization of audio communication data for the purposes of simplicity, though it should be noted that the principles described with regards to FIG. 1 apply equally to embodiments in which other types of communication data are captured and synchronized. For example, in addition to audio data, communication data captured and synchronized by the communication system can include video data, text data (such as instant messaging or email communications), action-based data (for instance, an action taken by a conversation participant with regard to a client device), or user state data (such as information describing or associated with conversation participants).

In the embodiment of FIG. 1, the communication system 100 includes a plurality of client devices (client device 105a, 105b, and 105c, collectively "client devices 105"), a speech recognition service 110, and a communication backend server 120. Although only three client devices are illustrated in the embodiment of FIG. 1, any number of users can use any number of client devices to participate in a conversation via the communication system 100. For instance, hundreds of users can participate in a conversation at once. In addition, although only one speech recognition service 110 is illustrated in the embodiment of FIG. 1, any number of speech recognition services can be used, for instance, one speech recognition service per client device 105, for instance embedded within each client device.

Users of each client device 105 use the client device to participate in a conversation via the communication system. In one embodiment, the client devices communicate directly with the other client devices such that the device-to-device communications do not travel through the communication backend server 120. For instance, the client devices can include tablet computers equipped with microphones and running a Voice Over Internet Protocol (VOIP) application. In this embodiment, the VOIP application is configured to transmit the speech of a user of a first tablet to a second tablet for playback on speakers of the second tablet. In such an embodiment, multiple users can speak to and hear each other simultaneously and in real-time.

Each client device 105 is configured to capture audio data from the user of the particular client device, and is further configured to store, at the client device, the time at which the audio data is captured. Each client device processes and/or encrypts the captured audio, and sends the captured audio to a speech recognition service 110. For example, client devices 105a, 105b, and 105c transmit captured audio 130a, 130b, and 130c (collectively "captured audio 130"), respectively, to the speech recognition service. The speech recognition service analyzes the captured audio received from a client device, determines a text transcript representing the captured audio, and provides the text transcript to the client device. For example, the speech recognition service provides the text transcripts 140a, 140b, and 140c (collectively "text transcripts 140") to the client devices 105a, 105b, and 105c, respectively.

Upon receiving a text transcript 140 representing captured audio 130 from the speech recognition service 110, each client device 105 timestamps the text transcript with the time at which the captured audio associated with the text transcript was captured, and sends the timestamped text transcript to the communication backend 120. For example, client devices 105a, 105b, and 105c timestamp received text transcripts, and transmit the timestamped text transcripts 150a, 150b, and 150c (collectively "timestamped text transcripts 150"), respectively, to the communication backend.

The communication backend synchronizes the timestamped text transcripts 150 and generates a conversation model based on the synchronized text transcripts. The conversation model is representative of a current or recent state of the conversation. The conversation model identifies key terms, entities, and other attributes of the conversation, and may also identity one or more conversation participants associated with each entity. The communication backend then identifies relevant documents targeted to the conversation among users of the client devices based on the conversation model, and provides the targeted documents 160 to the client devices.

The communication backend 120 provides relevant data to the client devices 105 targeted to the communications between users of the client devices. For example, for communications involving a particular restaurant, the communication backend can provide a website, menus, prices, or ratings associated with the restaurant. Similarly, for conversations about a road trip to New Orleans, the communication backend can provide gas prices, maps, hotel information, and information about tourist attractions in New Orleans. The communication backend is configured to operate in conjunction with the client devices such that users can communicate seamlessly through the client devices and the communication backend can analyze the communications between the users in the background. Data targeted to the communications can be provided to the client devices for display on the client devices.

Figure 2:
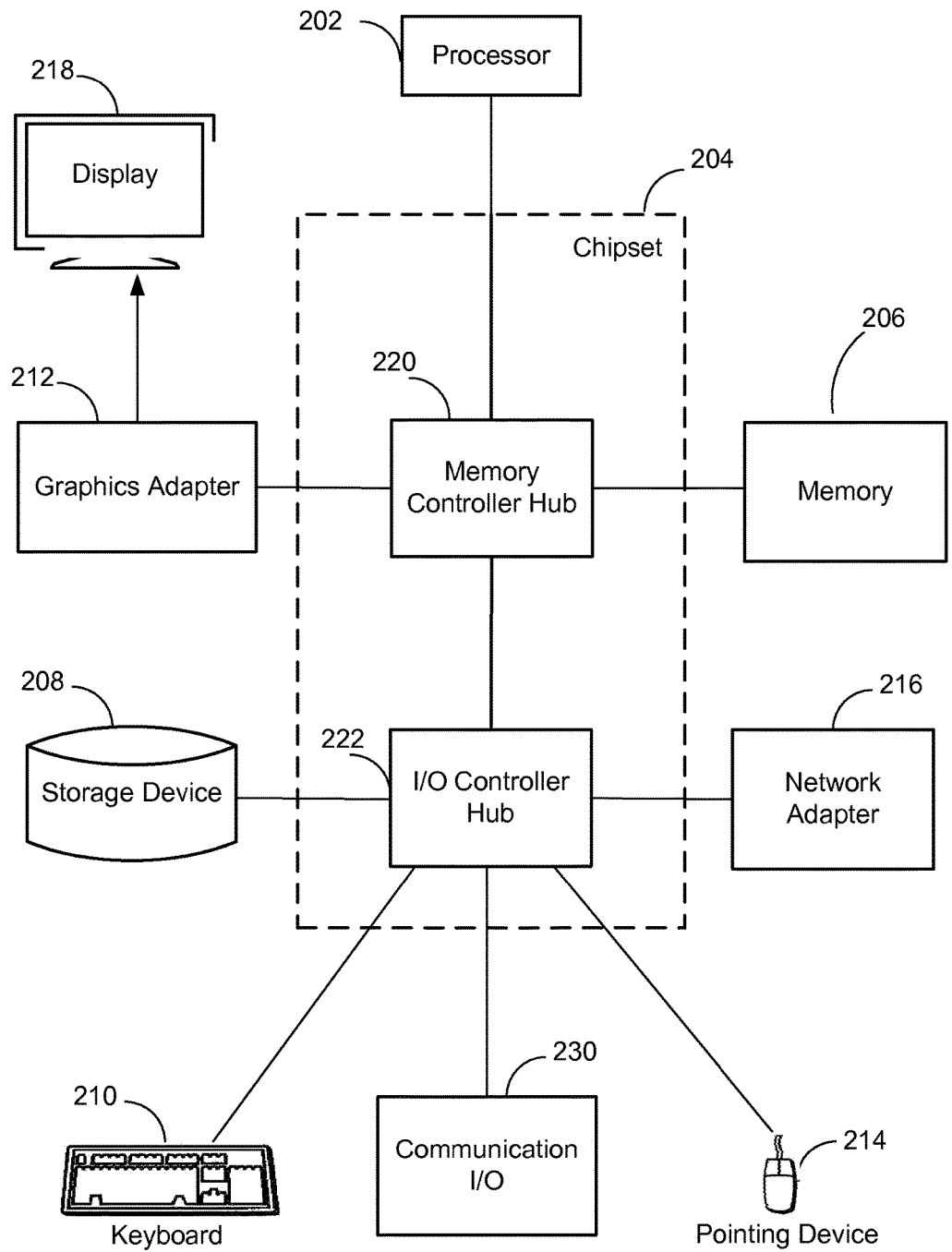
FIG. 2 is a high-level block diagram illustrating an example computer.

FIG. 2 is a high-level block diagram illustrating an example computer 200 for use as one or more of the entities of FIG. 1. The computer includes at least one processor 202 coupled to a chipset 204. The chipset includes a memory controller hub 220 and an input/output (I/O) controller hub 222. A memory 206 and a graphics adapter 212 are coupled to the memory controller hub, and a display 218 is coupled to the graphics adapter. A storage device 208, keyboard 210, pointing device 214, network adapter 216, and communication I/O 230 are coupled to the I/O controller hub. Other embodiments of the computer have different architectures.

The storage device 208 and memory 206 are non-transitory computer-readable storage mediums such as hard drives, compact disk read-only memories (CD-ROM), DVDs, or solid-state memory devices. The memory holds instructions and data used and executed by the processor 202. The pointing device 214 is a mouse, track ball, touch-sensitive display, or other type of pointing device, and is used in combination with the keyboard 210 to input data into the computer 200. The graphics adapter 212 displays images and other information on the display 218. The network adapter 216 couples the computer to one or more computer networks.

The communication I/O 230 includes devices configured to capture communication data from a user of the computer 200. For example, the communication I/O can include a microphone, a camera, a video camera, and the like. Communication data captured by the communication I/O is transmitted by the network adapter 216 via the I/O controller hub 222, is stored in the storage device 208 via the I/O controller hub, or is stored in the memory 206 via the memory controller hub 220. Prior to transmission or storage, the captured communication data can be processed by the processor 202.

The computer 200 is adapted to execute computer program modules for providing functionality described herein. As used herein, the term "module" refers to computer program logic used to provide the specified functionality.

Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, a client device 105 can be a desktop or laptop computer, a tablet computer, a mobile phone or other mobile device, a networked television or set-top box, or any other device capable of capturing communication data and communicating with the entities of FIG. 1. The speech recognition service 110 can be a computer, such as a desktop, laptop, tablet computer, or server; can be a software program executed on a computer, such as a native application on a client device, desktop, or mobile device; or can be a cloud-based application hosted on a datacenter of a web services company. The communication backend 120 can be a server (such as a blade server or web server), a datacenter, and the like. Each entity of FIG. 1 can include multiple computers, and multiple entities can be implemented in a single computer. It should be noted that some computers can lack various components described above, such as keyboards 210, graphics adapters 212, communication I/O 230, and displays 218.

Figure 3:
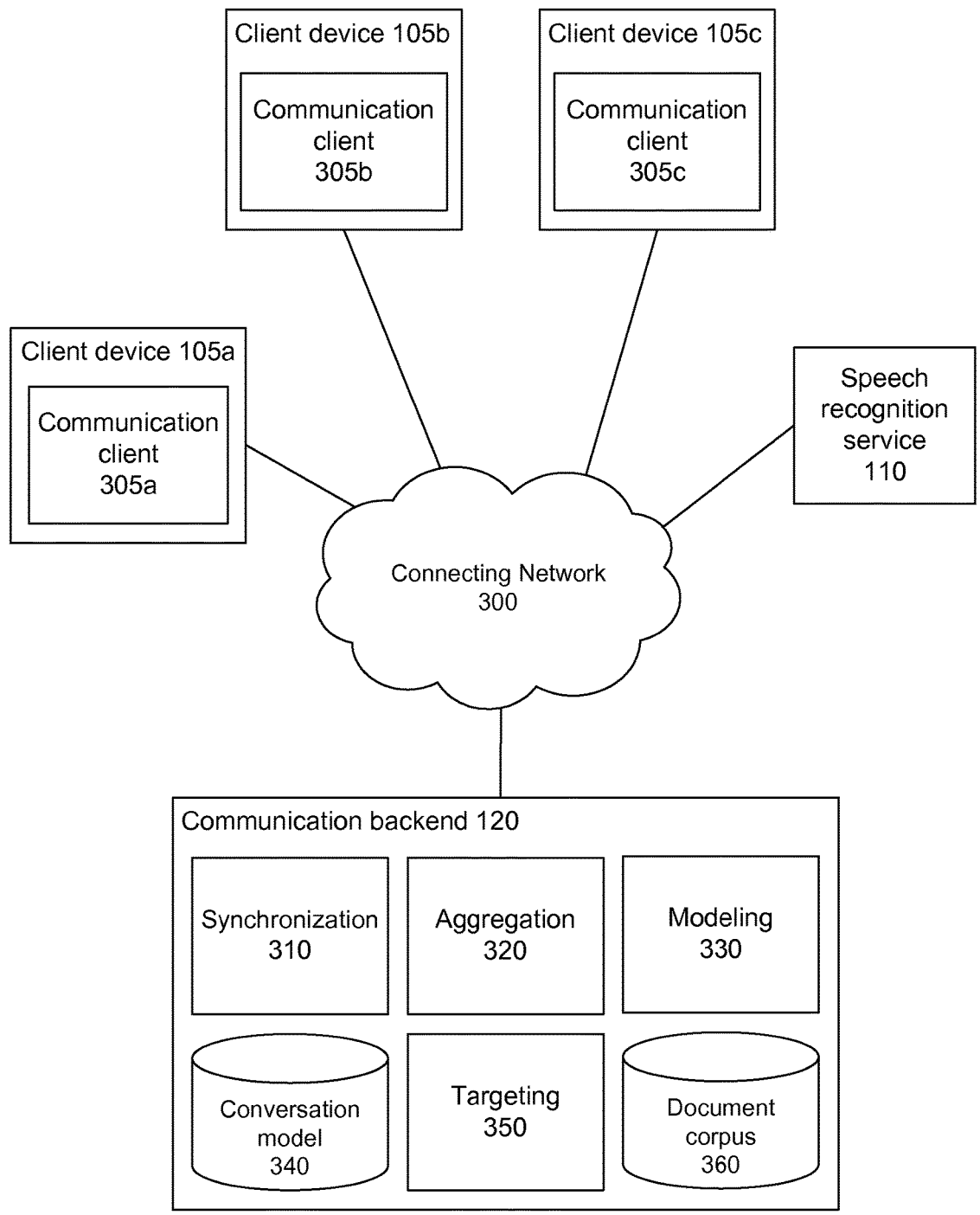
FIG. 3 is a high-level block diagram illustrating an operating environment for a multi-party communication synchronization system, according to one embodiment.

FIG. 3 is a high-level block diagram illustrating an operating environment of the multi-party communication synchronization system 100, according to one embodiment. The embodiment of FIG. 3 shows the plurality of client devices 105a, 105b, and 105c, each including a communication client 305a, 305b, and 305c (collectively "communication clients 305"). The embodiment of FIG. 3 further shows the speech recognition service 110 and the communication backend 120. The entities of FIG. 3 communicate via a connecting network 300. In other embodiments, the operating environment illustrated in FIG. 3 can include different components than those illustrated herein. For example, the speech recognition service can be implemented within each client device, for instance as an application operating on each client device, as described above.

The connecting network 300 provides a communication infrastructure between the client devices 105, the speech recognition service 110, and the communication backend 120. The connecting network is typically the Internet, but may be any network, including but not limited to a Local Area Network (LAN), a Metropolitan Area Network (MAN), a Wide Area Network (WAN), a mobile wired or wireless network, a private network, or a virtual private network. In addition, the connecting network can be an on-device network. For example, in an environment where the speech recognition service is implemented within a client device, the connecting network can include the on-device communication infrastructure between a communication client 305 on the client device and the speech recognition service on the device. In some embodiments, the connecting network includes multiple types of networks.

As discussed above, users use the client devices 105 to participate in a conversation via a communication system. A communication client 305 on a client device receives audio data from a user of the client device (for instance, speech of the user and accompanying background noise) and transmits the audio data to the communication clients on the client devices used by other participants to the conversation. A communication client on a client device can playback audio data received from other communication clients to a user of the client device. The communication client can be a native application, a web-based application, or any other entity capable of capturing, transmitting, receiving, and playing back audio data to and from other communication clients. In an example embodiment, a first client device can be a tablet computer, a second client device can be a mobile phone, a third client device can be a networked television, and the communication client on each client device can be an application that allows the users of the three client devices to speak to each other and to hear each other speak simultaneously or near-simultaneously.

The communication client 305 captures audio data from a user of a client device 105. For example, if a user of a client device says "Hi Frank, how are you", the communication client on the client device captures the audio data "Hi Frank, how are you". The captured audio data is stored in memory at the client device such as a memory buffer located at the client device. Captured audio data can be assigned an identifier, and the identifier can be stored in conjunction with the captured audio at the client device.

The communication client 305 captures audio data by sampling received analog signals associated with the audio data at a sampling rate and digitally representing the sampled audio signals. Captured audio can be stored in any format, for instance "raw"/uncompressed formats such as the pulse-code modulation (PCM) format, or compressed formats such as the MP3 format. The sampling rate at which audio data is sampled, the format used the digitally represent the audio data, and the bit depth and/or type of compression used to representing the audio data can be selected by a user of a client device 105, by the client device itself, by the communication client, or by any other entity. These sampling parameters can be selected based on network bandwidth considerations, based on the processing power of the client device, based on the requirements of the speech recognition service 110, or based on any other parameter related to the operation of the communication system 100. For example, audio data can be captured in the PCM format at a sampling rate of 16 kHz and using a bit depth of 16 bits.

The communication client 305 stores the captured audio data at the client device 105 as a series of audio frames. In one embodiment, each frame represents 20 ms of captured audio data; for captured audio data sampled at 16 KHz, each 20 ms frame represents approximately 320 individual samples of audio data. Frames are stored at the client device 105 in the order in which the audio data represented by the frames is captured. In one embodiment, the frames are indexed based on the time that each frame is captured. For example, if 50 frames of audio data are captured by the communication client 305 over the course of a user of the client device speaking, the 50 frames can be indexed with the indexes Frame_1 to Frame_50, with each successively captured frame indexed with a successive index.

The communication client can perform frame-level processing on stored audio frames. Example processing options include noise cancellation, echo cancellation, and the like. The communication client can also determine whether or not each stored audio frame includes human speech by processing each frame and analyzing whether the audio data stored in each frame includes audio signals indicative of speech. Frames containing speech can be classified by the communication client as containing speech. For example, if a frame includes captured sound representing a human voice, the communication client can classify the frame as containing speech, whereas if the frame includes captured sound associated with background or other non-voice noise, the communication client can classify the frame as not containing speech.

The communication client 305 identifies stored sequences of consecutively ordered frames based on whether the frames contain speech. Such identified sequences are referred to herein as "segments" of speech frames. Each segment includes one or more consecutively ordered frames containing audio data representing human speech. A segment of speech frames can represent a single word spoken by a user, multiple spoken words, a spoken sentence, multiple spoken sentences, or any other amount of continuous speech.

The communication client 305 can identify segments in real-time, for instance by determining if each frame contains speech as it is captured. For instance, if the communication client determines that a first captured frame contains speech, the communication client can identify the first frame as the beginning of a segment, can identify all consecutive successively captured frames containing speech as part of the segment, and can identify the last captured frame containing speech before capturing a frame not containing speech as the end of the segment.

Upon identifying segments, the communication client 305 can encode the segments. The type of encoding can be pre-determined, can be based on the encoding requirements of the speech recognition service, or can be based on the security requirements of the communication system 100 or the available bandwidth between the client device 105 and the speech recognition service. For example, the segments can be encoded into a 16-bit wide-band encrypted format in response to a determination that sufficient bandwidth is available for such a format and in response to a requirement that audio data be secure prior to transmission within the speech recognition service. Likewise, the segments can be encoded into a compressed format to reduce the amount of bandwidth required to send the segments in response to a determination that only limited bandwidth is available. Segments can be encoded individually, frame-by-frame, or can be concatenated together into a segment package and encoded together.

The communication client 305, in conjunction with capturing audio data from a user of the client device 105, also stores time data representing the time at which the audio data is captured. The communication client 305 associates the captured audio data with the stored time representing the captured audio data. For example, if a user of a client device says "Hi Claire, this is Jason" at 12:40:00 pm PST, the communication client on the client device associates the time [hours=12, minutes=40, seconds=00, am/pm=pm, time zone=PST] with the captured audio data representing the speech "Hi Claire, this is Jason". The association between stored time data and captured audio data can be made in a table stored at the client device that maps identifiers for audio data to time data representing the audio data. Time data can be associated with individual frames of audio data, with segments of audio data, with audio data representing a speech turn, with audio data representing an entire conversation, or with any other subset of audio data. It should be noted that time can be stored in any format with the audio data. In addition, it should be noted that a start time may be stored with a first frame in a first segment of audio data, and that time data associated with subsequent frames or segments may be determined by adding to the start time a time delta representing a known length of time associated with frames or segments.

The communication client 305 sends the identified segment to the speech recognition service 110. Alternatively, the communication client can identify multiple segments prior to sending any segments to the speech recognition service, for instance in order to identify segments comprising an entire speech turn of a user. The communication client can simultaneously send the multiple segments to the speech recognition service. The multiple segments can be sent to the speech recognition service in response to a threshold number of unsent segments being identified, in response to a threshold amount or percentage of memory or storage space at the client device 105 being filled by the identified segments, in response to the passage of a threshold amount of time since a previous segment was sent, in response to a determination that a user of the client device has paused or finished speaking, or in response to any other suitable factor.

The speech recognition service 110, upon receiving one or more segments of audio data, converts the received audio data into a text transcript of the received audio data. In one embodiment, the speech recognition service makes a text hypothesis for each word with the received audio data, which is a guess of a text transcript representing the word in the audio data of the received segments. The speech recognition service uses a speech recognition engine to process the received audio data and identify one or more words contained in the audio data. Words can be identified in the received audio data by comparing the received audio data to audio data representing known words. Words in the audio data are identified at a particular estimation of confidence. For instance, the speech recognition engine can process a first portion of audio data, and can identify the word "tree" in the first portion with a 90% confidence that the identification is correct, can identify the word "three" in the first portion with a 50% confidence, and can identify the word "free" in the first portion with a 30% confidence. Text hypotheses thus are combinations of a text transcript of an identified word and an estimated confidence that the word is identified in the text transcript correctly. Note that multiple text hypotheses can be made for each word within the received audio data.

The speech recognition service 110 produces one or more text hypotheses for each spoken word contained within the audio data of the received one or more segments. For each spoken word, the speech recognition service selects the text hypothesis associated with the highest estimated confidence. The speech recognition service combines the text associated with the selected text hypotheses to form a text transcript of the received audio data. The speech recognition service outputs the text transcript of the received audio data to the communication client 305 from which the corresponding audio data was received.

Upon receiving the text transcript of the one or more segments of audio data from the speech recognition service 110, the communication client 305 timestamps the text transcript with the time data associated with the corresponding audio data. As noted above, the communication client stores time data and associates the time data with audio data captured by the communication client. Thus, for one or more segments of audio data sent by the communication client to the speech recognition service, the communication client stores time data associated with the one or more segments of audio data. Upon receiving a text transcript of the one or more segments of audio data back from the speech recognition service, the communication client accesses the stored time data associated with the one or more segments of audio data. The accessed time data is used to timestamp the received text transcript. As used herein, "timestamping" refers to the association of time data and a text transcript. In one embodiment, timestamping includes the packaging of time data and a text transcript into a text transcript data structure. The time data in a timestamped text transcript represents the time at which the audio data represented by the text transcript was captured. The communication client sends the timestamped text transcript to the communication backend 120. It should be noted that in other embodiments, the timestamped text transcripts can include additional data, such as an identifier for the client device that captured the audio data, the identity of a user of the client device, information associated with a user context of the user, and the like.

The communication backend 120 receives timestamped text transcripts from one or more communication clients 305 via the connecting network 300. The communication backend can continuously receive timestamped text transcripts from the client devices 105 throughout the course of a conversation. For instance, every time a user of a client device speaks in a conversation, the communication client of the client device of the user can capture audio data from that user's speech, can send one or more segments of the captured audio data to the speech recognition service 120, can receive a text transcript from the speech recognition service, can timestamp the text transcript, and can send the timestamped text transcript to the communication backend. During the course of a conversation, this process can occur hundreds or thousands of times per client device.

In response to receiving the timestamped text transcripts during a conversation, the communication backend 120 synchronizes, aggregates, and analyzes the received timestamped text transcripts (hereinafter, "aggregated text"), generates a conversation model based on the aggregated text, and provides relevant documents targeted to the conversation and based on the conversation model to the client devices. The communication backend includes a synchronization module 310, an aggregation module 320, a modeling module 330, a conversation model storage module 340, a targeting module 350, and a document corpus 360 configured to perform these functions. In other embodiments, the communication backend includes different, additional, or fewer modules than those described herein.

The synchronization module 310 synchronizes timestamped text transcripts received from a plurality of client devices 105 based on the time data associated with the timestamped text transcripts. In one embodiment, the synchronization module synchronizes the text transcripts in real time, as the transcripts are received. Synchronizing timestamped text transcripts includes ordering the timestamped text transcripts chronologically. For example, assume the communication backend receives the following timestamped text transcripts (each including a text transcript and a time) from a conversation between two participants:

|   | Text Transcript | Time |
|---|---|---|
|   | Sounds like fun | 5:23:29 pm PST |
|   | Hello | 5:23:09 pm PST |
|   | Hi Sam | 5:23:06 pm PST |
|   | Pretty good just got back from the baseball game | 5:23:24 pm PST |
|   | How are you doing | 5:23:15 pm PST |

The synchronization module 310 can re-order the timestamped text transcripts as follows:

|   | Text Transcript | Time |
|---|---|---|
| 1 | Hi Sam | 5:23:06 pm PST |
| 2 | Hello | 5:23:09 pm PST |
| 3 | How are you doing | 5:23:15 pm PST |
| 4 | Pretty good just got back from the baseball game | 5:23:24 pm PST |
| 5 | Sounds like fun | 5:23:29 pm PST |

It should be noted that the synchronization of text transcripts by the time data associated with the text transcripts can be more accurate than merely ordering timestamped text transcripts based on the times that the timestamped text transcripts are received at the communication backend 120, as the time of receipt of the timestamped text transcripts can be delayed. For instance, the communication clients 305 can delay sending one or more timestamped text transcripts, or network delay in the connecting network 300 can delay the delivery of one or more timestamped text transcripts. As the communication backend receives additional timestamped text transcripts resulting from a conversation, the synchronization module 310 continually synchronizes the timestamped text transcripts. In one embodiment, the synchronization module synchronizes the timestamped text transcripts in real-time, as the text transcripts are received from the client devices 105.

The aggregation module 320 compiles the synchronized text into aggregated text. The aggregated text can be ordered based on the timestamps associated with the synchronized text, and can be organized by speaker associated with each text transcript. In one embodiment, the aggregation module removes duplicate text, text determined to not be relevant, or text that does not satisfy one or more other parameters used to determine whether to include the text in the aggregated text. The aggregation module can aggregate text over particular periods of time (for instance, text occurring within the last 60 seconds), and can continuously update the aggregated text as additional text is received. The aggregated text is output to the modeling module 330, though in other embodiments, the aggregated text can be stored in an aggregated text storage module (not shown) for subsequent retrieval.

The modeling module 330 receives the aggregated text and generates a conversation model based on the aggregated text. The modeling module stores the generated conversation model in the conversation model storage module 340. The targeting module 350 identifies one or more documents stored in the document corpus 360 for recommendation to a communication client 305 based on the conversation model. The modeling module, conversation model, and targeting module are described in greater detail below.

Although the embodiment of FIG. 3 is described herein with reference to the capture, synchronization, and analysis of audio data, it should be noted that the principles described herein apply to other types of communication data as well. For example, the communication clients 305 can capture video data, and a video recognition service (not illustrated) can identify video characteristics (such as facial expressions, face, gesture, and object recognition, and the like). The video characteristics can be synchronized and included in the conversation model generated by the modeling module 330. Similarly, other forms of communication data, such as text communication or action-based communication, and non-communication forms of data, such as user context information, can be synchronized, analyzed, and used to generate and/or update the relevance model.

Conversation Model Generation

Figure 4A:
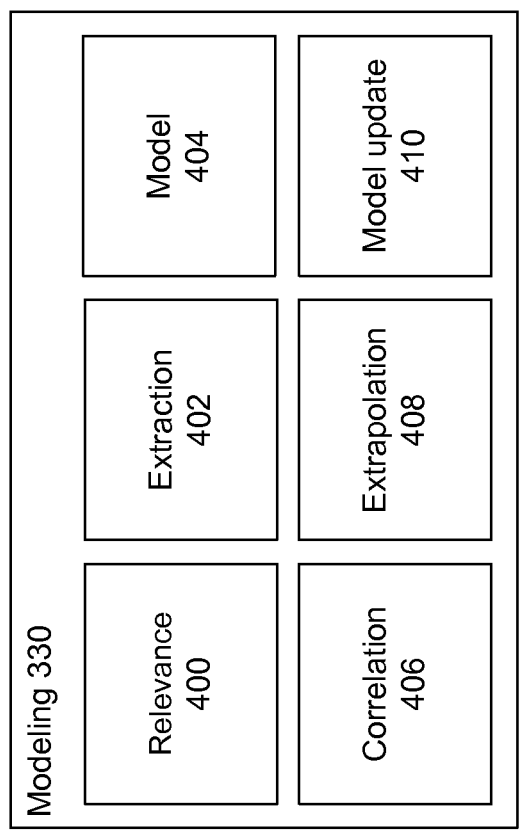
FIG. 4a is a block diagram illustrating a modeling module for use in the communication backend system of the operating environment of FIG. 3, according to one embodiment.
Figure 4B:
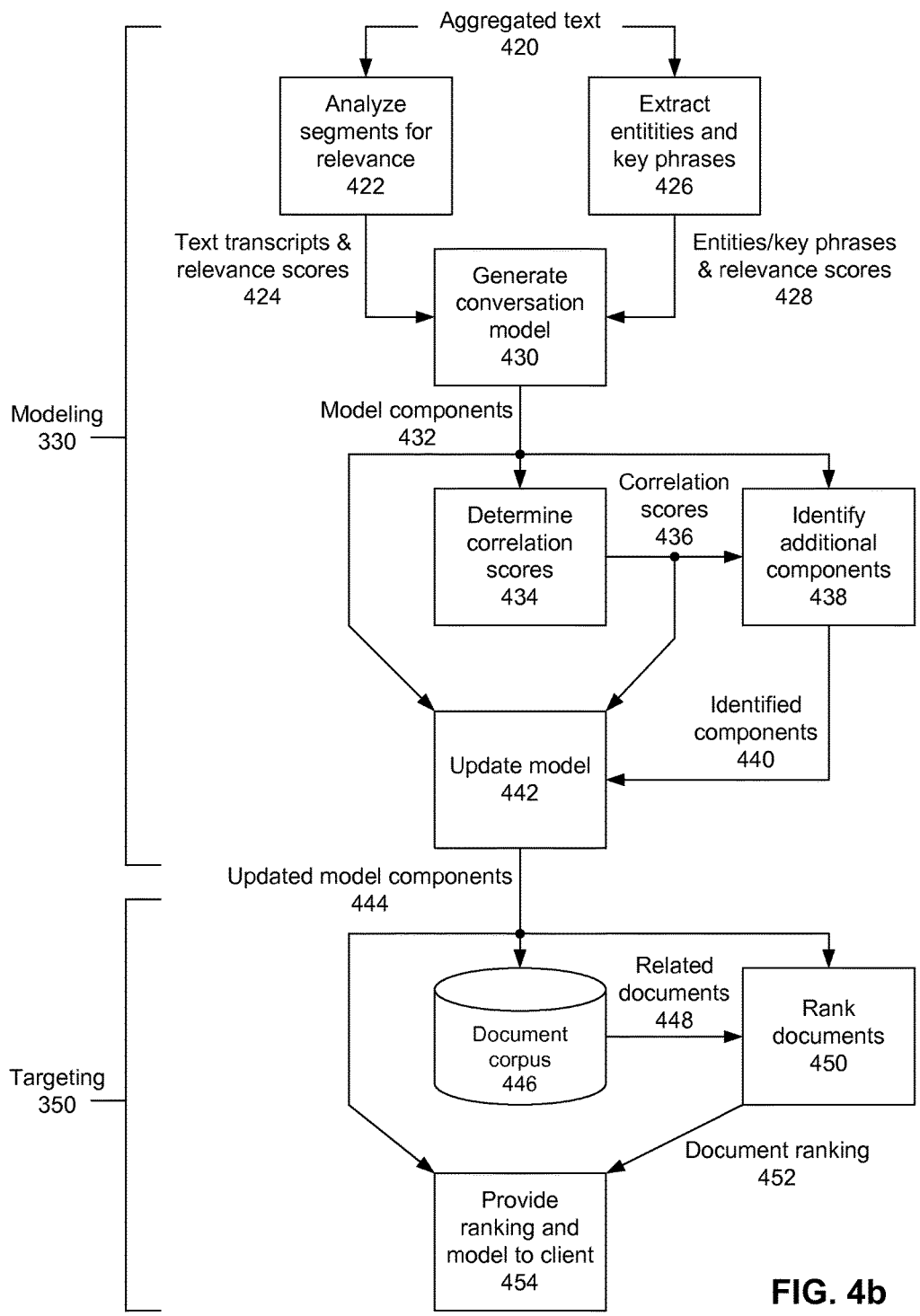
FIG. 4b is a diagram illustrating dataflow through the modeling module and the targeting module of FIG. 3, according to one embodiment.

FIG. 4a is a block diagram illustrating a modeling module for use in the communication backend system of the operating environment of FIG. 3, according to one embodiment. FIG. 4b is a diagram illustrating dataflow through the modeling module 330 and the targeting module 350 of FIG. 3, according to one embodiment. FIGS. 4a and 4b will be described in conjunction with each other herein. The modeling module 330 includes a relevance module 400, an extraction module 402, a model module 404, a correlation module 406, an extrapolation module 408, and a model update module 410.

The relevance module 400 receives the aggregated text 420 from the aggregation module 320 of FIG. 3, and analyzes 422 segments of the aggregated text (herein, "text transcripts") for relevance. A text transcript can include as few as one or more words, and as many as several sentences. The relevance module 400 can determine a text transcript relevance score representing the relevance of a text transcript to an associated conversation. The relevance module then sends text transcripts and associated text transcript relevance scores 424 to the model module 404 for use in generating a conversation model.

The relevance module 400 identifies text transcripts within the aggregated text 420, for instance portions of text associated with a particular conversation participant. For each identified text transcript, the relevance module queries a text index with the text transcript to identify documents including one or more terms of the text transcript. The text index can be the Internet, and querying the text index with the text transcript can include searching the Internet using a search engine. The text index can also be locally stored, and can be populated with information from various sources such as the internet, linked datasets, personal datasets, and the like.

For each text transcript, the relevance module 400 receives query results from the text index associated with the text transcript. For each query result, a set of result components is identified. The result components include data associated with a query result and related to terms in the text transcript, such as terms in a result document, a source of a result document, and the like. The result components associated with each query result can include but are not limited to:
 The title of the result (for instance, if the result is an article, the title of the article), or a title associated with the result (for instance, if the result is found within a webpage, the title of the webpage)
 A description of the result (such as a descriptive summary or metadata)
 A source URL (such as the domain of the result, or the full URL to the result)
 A result type (for instance, a webpage, an article, an image, a document, a file, a database entry, and the like)
 Key phrases within the query result (discussed in greater detail below)
 Entities within the query result (discussed in greater detail below)

A transcript vector is generated by the relevance module 400 for the text transcript including result components for the query results associated with the text transcript. Each transcript vector entry includes a result component and a count representing the number of occurrences of the result component within the query results. For instance, if 4 query results are titled "Space exploration", an associated entry of "(Space exploration, 4)" is included in the transcript vector.

Likewise, if the entity "Jackie Robinson" is associated with one query result, the entry "(Jackie Robinson, 1)" is included in the transcript vector.

The relevance module 400 determines a text transcript relevance score for the text transcript by classifying the transcript vector associated with the text transcript with a transcript classifier. The transcript classifier is trained using a set of training transcript vectors. The transcript classifier produces a text transcript relevance score for the text transcript based on a set of attributes of the transcript vector associated with the text transcript. Transcript vector attributes describe properties of transcript vector components, counts associated with the components, relationships between the components, and the like. Transcript vector attributes include but are not limited to:
 The greatest count associated with a transcript vector entry
 The sum of the $2^{nd}$-$10^{th}$ greatest counts associated with transcript vector entries
 The sum of the counts associated with all transcript vector entries
 The total number of entities in the transcript vector
 The total number of nouns in the transcript vector
 The greatest inverse document frequency ("IDF") for transcript vector entries
 The average IDF for transcript vector entries
 The percentage of vector entries associated with text included in the text transcript
 The number of vector entries associated with text included in the text transcript
 The product of the percentage of vector entries associated with text included in the text transcript and the number of vector entries associated with text included in the text transcript
 The domains of URLs included in the transcript vector (for instance, based on a pre-determined ranking of preferred domains)

The relevance module 400 determines the above attributes for each transcript vector associated with each text transcript, and determines a text transcript relevance score for each text transcript using the classifier based on the determined attributes. A text transcript relevance score represents the relevance of a text transcript to the conversation with which the text transcript is associated. For each text transcript in the aggregated text 420, the relevance module outputs the text transcript and an associated text transcript relevance score to the model module 404. In some embodiments, the relevance module only outputs text transcripts associated with a text transcript relevance score that exceeds a pre-determined threshold. It should be noted that the relevance module can also output, for each text transcript and associated text transcript relevance score, the transcript vector associated with the text transcript, a timestamp associated with the text transcript, and an identifier for the conversation with which the text transcript is associated.

The extraction module 402 receives the aggregated text 420 from the aggregation module 320 of FIG. 3, and extracts 426 entities and key phrases from the aggregated text. An entity can include a proper noun (such as a person or a place), an object associated with a linked dataset entry, or any other suitable concept or thing. A key phrase can include a phrase within a conversation determined to be relevant or representative of the conversation. The extraction module then sends the entities, key phrases and associated key phrase and entity relevance scores 428 to the model module 404 for use in generating a conversation model.

The extraction module 402 identifies a set of entities and a set of key phrases within the aggregated text 420. The identification of entities is described in greater detail below, though it should be noted that any method of identifying entities can be used. In one embodiment, a set of potential entities is identified and analyzed; in this embodiment, any potential entity determined to not represent an entity might be determined instead to be a key phrase. Key phrases can also include noun phrases, nouns, objects, concepts, multi-word sequences occurring within the aggregated text, and the like.

The extraction module 402 generates, for each key phrase in the identified set of key phrases, a key phrase vector including key phrase components representing characteristics of the key phrase. Similar to the relevance module 400, the extraction module can query a text index or linked dataset with a key phrase, and generate a key phrase vector based on the query results. The key phrase vector can include titles associated with query results, descriptions of the results, URLs associated with the results, result types, and the like.

The extraction module 402 determines a key phrase relevance score for each key phrase in the identified set of key phrases by classifying a key phrase vector associated with each phrase with a classifier. A key phrase relevance score describes the relevance of the key phrase to the conversation with which the key phrase is associated. In one embodiment, the extraction module uses the same classifier used by the relevance module 400, for instance configured to determine a relevance score based on the same set of vector attributes, though trained on a set of training key phrases instead of a set of training text transcripts. In other embodiments, the extraction module uses a different classifier or a classifier configured to produce a relevance score based on a different vector attributes. The extraction module outputs key phrases and associated key phrase relevance scores to the model module 404, and in some embodiments also outputs associated key phrase vectors, timestamps, conversation identifiers, and the like.

The extraction module 402 also generates, for each entity in the identified set of entities, an entity vector including entity components representing characteristics of the entity. In one embodiment, the extraction module generates entity vectors only for one-word entities, though in other embodiments, the entity vectors are generated for all entities. The extraction module can query a text index or linked dataset with each entity, and can generate the entity vector based on the query results. An entity relevance score can be generated for each entity by classifying an entity vector associated with the entity. An entity relevance score describes the relevance of the entity to the conversation with which the entity is associated. In one embodiment, the extraction module uses the same classifier to generate relevance scores for key phrases and entities, though in other embodiments, the extraction module uses a different classifier or a classifier trained on different training data (such as a set of training key phrases and a set of training entities). For instance, the extraction module can use a classifier to generate an entity relevance score for each entity based on, for example, one or more of the following attributes:

The type of entity (e.g., a person, a location, a business, or any other top-level taxonomy)

The most prominent name associated with the entity (determined by querying a name database)

The size of the top entry associated with the entity in a linked dataset (for instance, the most popular entry associated with the entity, the entry associated with the entity that is linked to the most other entries, the entry that best matches the entity, and the like)

The number of linked dataset entries associated with the top entry associated with the entity in a linked dataset The number of languages represented by linked dataset entries associated with the entity The number of quotations in a quotation database associated with the entity or the top entry associated with the entity in a linked dataset For each entity in the set of entities, the extraction module 402 can determine one or more of the above-listed attributes for the entity, and can determine an entity relevance score for the entity by classifying the entity using the determined attributes. The extraction module outputs the entities and associated entity relevance scores to the model module 404, and in some embodiments also outputs associated entity vectors, timestamps, conversation identifiers, and the like.

The model module 404 receives the text transcripts and associated text transcript relevance scores 424 from the relevance module 400, receives the entities, key phrases, and associated entity and key phrase relevance scores 428 from the extraction module 402, and generates 430 a conversation model based on the received text transcripts, entities, key phrases, and relevance scores. The generated conversation model describes components of a conversation (such as text transcripts, entities, key phrases, relevance scores, attributes, timestamps, identifiers, and the like) and relatedness between the conversation components. In embodiments in which the model module also receives vectors, timestamps, and conversation identifiers, the model module generates a conversation model based additionally on the vectors, timestamps, and conversation identifiers as well.

The conversation model generated by the model module 404 can be visualized as a logical matrix with N rows and N columns, where N is the total number of received text transcripts, entities, and key phrases. The received text transcripts, entities, and key phrases are collectively referred to herein as "model components". Further, the received text transcript relevance scores, entity relevance scores, and key phrase relevance scores are collectively referred to herein as "relevance scores". Each model component is associated with one matrix column and one matrix row. The model module can store the generated conversation model in the conversation model storage module 340 for subsequent access by the correlation module 406 and the extrapolation module 408, or can output conversation model components 432 directly to these modules. The remainder of the description herein will assume that each model component is stored in conjunction with a component vector associated with the model component (such as a transcript vector, entity vector, or key phrase vector), a timestamp associated with the model component, and a conversation identifier associated with the model component, though the principles described herein apply equally to other embodiments as well.

The correlation module 406 retrieves the conversation model components from the conversation model storage module 340, or receives the components directly from the model module 404. The correlation module then generates 434 a correlation score for some or all pairs of received/retrieved model components describing the relatedness between the pair of model components, and outputs the generated correlation scores 436 to the extrapolation module 408 and the model update module 410. It should be noted that although the correlation module describes correlation scores for pairs of model components, in other embodiments, correlation scores can be determined for three or more model components and used according to the principles described herein. In one embodiment, the correlation module generates a correlation score between only model components that are associated with a timestamp that occurred within a previous threshold amount of time. For example, the correlation module may generate correlation scores for pairs of components associated with timestamps occurring within the previous 60 seconds. The correlation module stores the generated correlation scores within the conversation model. In the embodiment in which the conversation model is stored as a N×N matrix, a correlation score associated with two model components is stored within the matrix at the intersection of the row associated with a first of the components and a column associated with a second of the components.

To generate a correlation score between a pair of components, $C_1$ and $C_2$, the correlation module 406 determines a cross-match score and an intersection score based on the component vectors associated with the components, $V_{C1}$ and $V_{C2}$, respectively. In one embodiment, the correlation module generates the correlation score between $C_1$ and $C_2$ according to the equation:

$$\text{Correlation score} = (10 * \text{crossmatch score}) + \text{intersection score} \quad \text{Equation 1}$$

To determine the cross-match score between $C_1$ and $C_2$, the correlation module 406 determines a first cross-match number based on $C_1$ and $V_{C2}$ and a second cross-match number based on $C_2$ and $V_{C1}$. The cross-match score is the sum of the first cross-match number and the second cross-match number. The first cross-match number is the number of words or tokens of $C_1$ included within the entries of $V_{C2}$. The second cross-match number is the number of words or tokens of $C_2$ included within the entries of $V_{C1}$. In one embodiment, the correlation module identifies all possible words or tokens within each component for use in determining the first and second cross-match numbers. The first and second cross-match numbers can represent the number of words or tokens within a component that exactly match a component vector entry (for instance, a case-sensitive match), that mostly match a component vector entry (for instance, a case-insensitive match), or that match a portion of a component vector entry (for instance, a word of the component matches a word within a component vector entry).

The intersection score is the number of component vector entries in common between $V_{C1}$ and $V_{C2}$. The intersection score can represent the number of common case-sensitive component vector entries, the number of common case-insensitive component vector entries, or the number of partial common component vector entries (an entry in a first of the component vectors matching a portion of an entry in the second of the component vectors).

The extrapolation module 408 receives the correlation scores generated by the correlation module 406 and model components from the conversation model storage module 340 (or directly from the model module 404), and identifies 438 extrapolated components for inclusion in the conversation model based on the received correlation scores and model components. The extrapolation module can identify component vector entries associated with counts above a pre-determined threshold for inclusion in the conversation model. For example, if a component vector entry includes "Paris (France), 6", and if the pre-determined threshold is 3, then the component "Paris (France)" is identified for inclusion in the conversation model.

In one embodiment, to identify extrapolated components, the extrapolation module 408 identifies component pairs consisting of a key phrase and an entity. If the correlation score associated with the key phrase and entity exceeds a pre-determined threshold, the extrapolation module combines the key phrase and entity to form a new component for inclusion in the conversation model. The extrapolation module can determine whether the correlation score exceeds the pre-determined threshold for each key phrase-entity component pair in the received components, or for a subset of the key phrase-entity component pairs. It should be noted that in other embodiments, the extrapolation module can combine two components of any type if the correlation score associated with the pair of components exceeds a pre-determined threshold.

The model update module 410 receives and updates the conversation model based on the model components 432, the correlation scores 436, and the extrapolated identified components 440. The model update module stores each correlation score in the conversation model storage module 340 with the stored model component pair with which the correlation score is associated. The model update module also stores the extrapolated components in the conversation model. In one embodiment, the correlation module 406 subsequently determines correlation scores for model component pairs including the one or more extrapolated components, though in other embodiments, the extrapolated components are added to the conversation model without correlation scores.

It should be noted that the modeling module 330 may continually update the conversation model, for instance periodically, in real-time, or in response to receiving additional conversation text from the client devices. In such embodiments, the conversation model components and associated correlation scores are continually updated to reflect the furtherance of a conversation. Accordingly, the conversation model changes over time to reflect the increases and decreases in relevance of various model components to the conversation.

Conversation Targeting

The targeting module 350 of FIG. 3 receives updated model components 444 from the conversation model storage module 340, and identifies one or more documents stored in the document corpus 360 for providing to a client device 105 based on the updated model components. The document corpus stores a plurality of objects, such as text documents, web pages, search results, image search results, social networking system listings, maps, businesses, business information, ads, movies, images, reviews, and any other object that can be recommended to a client. In one embodiment, the document corpus comprises a distributed online dataset, such as a plurality of online databases including but not limited to business directories, document repositories, review websites, and the like.

The targeting module 350 identifies a set of documents within the document corpus 360 associated with each model component (referred to herein as a "document bundles" 448). To identify a document bundle associated with a model component, the targeting module can query the document corpus using text associated with the model component, and can receive the identities of documents in the document corpus associated with the queried text. For example, for the model component "San Francisco Giants", the targeting module can query the document corpus, and can receive the identities of documents containing the text "San Francisco Giants". The targeting module can also query the document corpus with entries of the component vector associated with a model component. In such an embodiment, documents associated with a threshold number of component vector entries can be identified as a document bundle associated with the model component. In one embodiment, each model component is pre-associated with a document bundle. In such an embodiment, querying the document corpus with a model component results in the return of the document bundle associated with the model component.

The targeting module 350 can identify document bundles for model components associated with timestamps that occurred within a previous threshold amount of time. For example, the targeting module can identify document bundles for each model component in the conversation model associated with a timestamp less than 60 seconds old. The previous threshold amount of time can be constant or variable, and can be based on characteristics of the conversation (such as the number of conversation participants, the length of the conversation, the identities of the conversation participants, etc.).

The targeting module 350 takes the union of all documents associated with identified document bundles (referred to herein as the "document superbundle"), and ranks the documents in the superbundle according to a determined conversation relevance. First, for a set of updated model components (such as all components associated with a timestamp less than 60 seconds old), the targeting module splits each component into tokens (for instance, words within the component) to form a set of tokens. The targeting module then determines a ranking score $Rank_{score}(D)$ for each document in the superbundle based on the set of tokens and based on the contents of the documents in the superbundle, and ranks the documents based on the determined ranking scores.

To determine a ranking score, the targeting module 350 performs term frequency-inverse document frequency (TF-IDF) on the contents of a document in the superbundle for each token in the set of tokens. The ranking score is then based on the determined TF-IDF. In one embodiment, the ranking score for the document is the Okapi BM25 TF-IDF score for the document based on the set of tokens, determined according to the equation:

$$Rank_{score}(D) = \sum_{i=1}^{n} IDF(q_i) * TF(q_i, D) \qquad \text{Equation 2}$$

In equation 2, the ranking score $Rank_{score}$ is determined for the document D based on the set of n tokens, $IDF(q_i)$ is the IDF weight of token $q_i$, and $TF(q_i, D)$ is a term frequency function of the token $q_i$ and the document D. $TF(q_i, D)$ can be computed as follows:

$$TF(q_i, D) = \frac{f(q_i, D) * (k_1 + 1)}{f(q_i, D) + k_1 * \left(1 - b + b * \frac{|D|}{avgdl}\right)} \qquad \text{Equation 3}$$

In equation 3, $f(q_i, D)$ is the token frequency of the token $q_i$ in D, $|D|$ is the length of D in words, avgdl is the average document length within the corpus, $k_1$ and b are free parameters (chosen, for instance, such that $k_1 \in [1.2, 2.0]$ and b=0.75), and $IDF(q_i)$ is the IDF weight of $q_i$ computed, for example as:

$$IDF(q_i) = \log\left(\frac{N - n(q_i) + .5}{n(q_i) + .5}\right) \qquad \text{Equation 4}$$

In equation 4, N is the total number of documents in the corpus and $n(q_i)$ is the number of documents in the superbundle containing the token $q_i$. In other embodiments, the IDF weight can be computed as $$IDF(q_i) = \log\left(\frac{N}{n(q_i)}\right)$$

or any other suitable computation.

It should be noted that in other embodiments, the targeting module 350 determines a ranking score for each document differently than the methods of Equations 2-4. For example, the targeting module can vary the value for the free parameter b in Equation 3 based on the type of document D. In such an embodiment, the value of the free parameter b can be greater for maps than for text documents, greater for ads than for videos, and the like. In this embodiment, the value of b can be pre-determined such that all document types have equal footing in determining document ranking scores. In other embodiments, ranking scores can be determined using any method such that documents are ranked based on the prevalence of tokens within the documents relative to the length of the documents.

In one embodiment, $Rank_{score}(D)$ can be computed as follows:

$$Rank_{score}(D) = \frac{1}{n}\sum_{i=1}^{n} Rank(q_i) \qquad \text{Equation 5}$$

In equation 5, $Rank(q_i)$ is computed as follows:

$$Rank(q_i) = \sum_{i=1}^{n} IDF(q_i) * TF(q_i, D) * T(q_i) * R(q_i) * S(q_i, D) \qquad \text{Equation 6}$$

In equation 6, $T(q_i)$ is a timestamp weight determined for the token $q_i$, $R(q_i)$ is the relevance score for the parent component of the token $q_i$ (retrieved, for example, from the conversation model), $C(q_i)$ is the sum of all correlation scores associated with the parent component of the token $q_i$ (for instance, the sum of all correlation scores between the parent component of $q_i$ and all other components in the conversation model associated with a timestamp that occurred within a previous threshold of time), and $S(q_i, D)$ is a weighting coefficient based on the type of the parent component of $q_i$ (the top-level taxonomy of the parent component, such as a business, a person, etc.) and the type of document D (a text document, a map, etc.). $S(q_i, D)$ can be retrieved from a table storing weighting coefficients for each combination of parent component type and document type. As used herein, "parent component" refers to a model component of which a token $q_i$ used to determine $Rank(q_i)$ or $Rank_{score}(D)$ is a part. In one embodiment, the targeting module 350 limits the factors used to determine ranking scores and IDF weights to factors associated with parent components associated with timestamps that occurred within a previous threshold of time, such as timestamps occurring within the previous 60 seconds.

The targeting module 350 can determine the timestamp weight $T(q_i)$ based on the timestamp associated with the parent component of $q_i$. For example, if $C_x$ is the parent component of $q_y$ and is associated with a timestamp z, the targeting module can determine $T(q_y)$ based on the timestamp z. Generally, timestamp weights are determined according to a decay function that gives larger weight to more recently-occurring timestamps and smaller weight to less recently-occurring timestamps. In such embodiments, a timestamp weight $T(q_1)$ is greater than a timestamp weight $T(q_2)$ if the parent component of $q_1$ is associated with a more recently occurring timestamp than the timestamp associated with the parent component of $q_1$. The decay function can have very little decay for timestamps occurring more recently than a pre-determined decay threshold, and can decay exponentially for timestamps occurring after the pre-determined decay threshold.

The targeting module 350, after determining a ranking score for each document in the superbundle, can initially rank the documents based on the ranking scores. The targeting module can then de-duplicate the initial ranking by removing identical or substantially similar documents from the initial ranking In some embodiments, the targeting module de-duplicates the document superbundle before determining ranking scores for the superbundle documents.

The targeting module 350 selects one or more documents for presenting to a client device based on the determined document ranking In one embodiment, the targeting module selects the top ranked document, or a threshold number of top-ranked documents, for display on the client device. In other embodiments, the targeting module can select any document ranked above a ranking threshold. The ranking module can select a document based additionally on a context of a user of a client device. For example, if the client device is a mobile phone, the ranking module can select top-ranked document formatted to fit a smaller mobile phone screen, and if the user is driving a car, the ranking module can select the top-ranked map for display on a navigation system. The user context can include the device used by the user, the location of the user, the identity of the user, information associated with the user, portions of the conversation spoken by the user, historical conversation information associated with the user, and the like.

Figure 5:
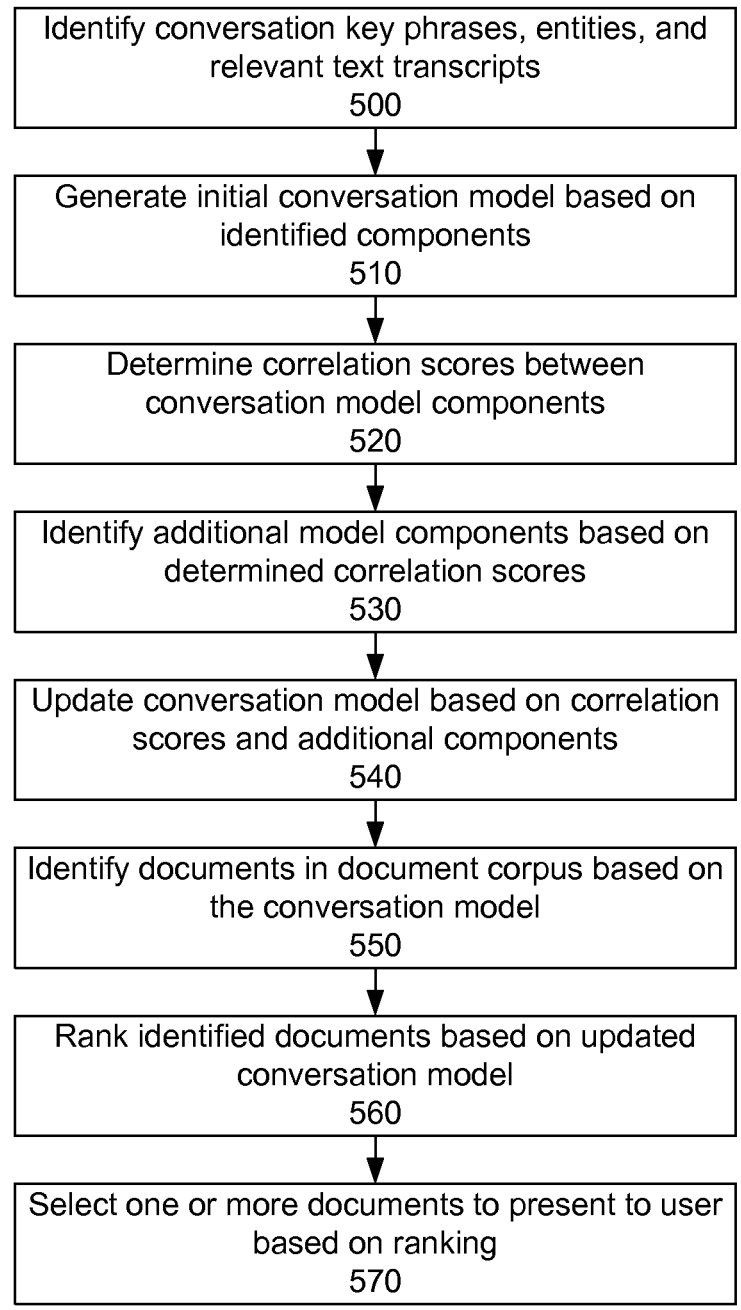
FIG. 5 is a flow chart illustrating a process for generating a conversation model and selecting documents for presentation to a user based on the conversation model, according to one embodiment.

FIG. 5 is a flow chart illustrating a process for generating a conversation model and selecting documents for presentation to a user based on the conversation model, according to one embodiment. Key phrases, entities, and relevant text transcripts ("model components") are identified 500. As described above, identifying model components can include determining relevance scores, component vectors, timestamps, and conversation identifiers for each model component.

An initial conversation model is generated 510 based on the identified components. Correlation scores are determined 520 between each model component pair describing the relatedness between the model components in each pair. Extrapolated components are identified 530 based on the determined correlation scores, and the conversation model is updated 540 to include the correlation scores and the extrapolated components.

Documents associated with the updated conversation model components are identified 550 from a document corpus. The identified documents are combined into a superbundle, and are ranked 560 based on the model components. The documents can be ranked using TF-IDF based on tokens within the model components, and how frequently the tokens appear in the documents relative to the length of the documents. One or more documents are selected 570 for presentation to a user based on the ranking Documents may also be selected based on a user context within a conversation.

Entity Extraction

Figure 6:
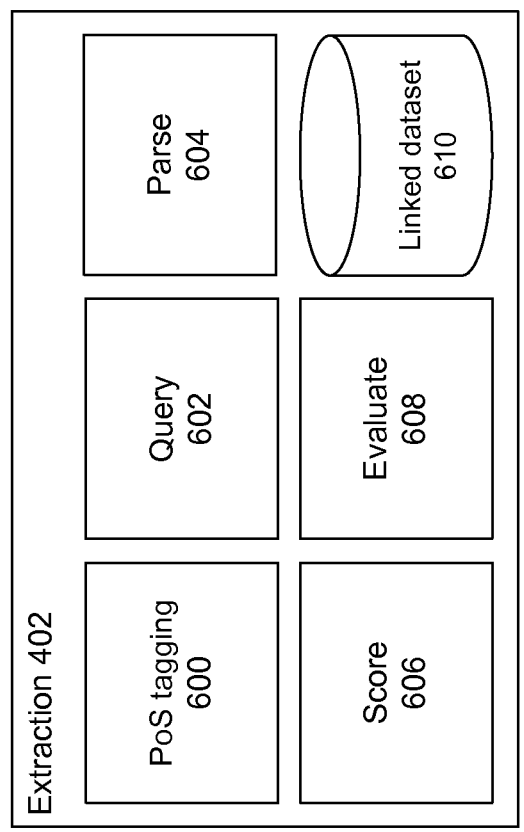
FIG. 6 is a block diagram illustrating an entity extraction module for use in the modeling module of FIG. 4a, according to one embodiment.

FIG. 6 is a block diagram illustrating an entity extraction module 402 for use in the modeling module 330 of FIG. 4a, according to one embodiment. The extraction module includes a part of speech ("PoS") tagging module 600, a query module 602, a parse module 604, a score module 606, an evaluate module 608, and a linked dataset 610. It should be noted that in other embodiments, the extraction module can include different modules configured to perform the functionalities described herein.

The extraction module 402 receives aggregated text 420 and identifies a set of disambiguated entities within the aggregated text. As used herein, a "disambiguated entity" is a uniquely identifiable entity. For example, "Kansas City" is an ambiguous entity that can refer to either "Kansas City, Mo." or "Kansas City, Kans.", both of which are disambiguated forms of "Kansas City". In one embodiment, ambiguous entities are identified as key phrases for use in generating the conversation model.

The PoS tagging module 600 identifies a set of potential noun phrases within the aggregated text 420. The PoS tagging module identifies nouns within the aggregated text, and applies one or more pre-determined noun phrase rules to identify words surrounding the identified nouns for inclusion in the noun-phrases. For example, for the sentence: "Election year politics are annoying.", the PoS tagging module identifies the noun "politics", and applies a rule identifying the noun modifier "election year" to create the noun phrase "election year politics". Any part of speech tagging methods may be used to identify potential noun phrases, including the use of hidden Markov models, dynamic programming part of speech tagging algorithms, sliding window part of speech tagging, and the like.

The query module 602 queries the linked dataset 610 with the set of potential noun phrases to identify linked dataset entries associated with the potential noun phrases. The linked dataset is a set of data entries, some of which include links to one or more other entries. In one embodiment, the linked dataset is Wikipedia.com, though in other embodiments, the linked dataset is a customized dataset populated with data retrieved from a variety of sources, such as various online and offline databases, directories, social networking system objects, media objects, text documents, and the like.

The query module 602 queries the linked dataset 610 with a potential noun phrase by breaking the potential noun phrase into an n-gram hierarchy. The top level of hierarchy represents the least noun phrase ambiguity and includes the entire potential noun phrase. For example, if the potential noun phrase is "chocolate covered strawberries", the query module queries the linked dataset with the n-gram "chocolate covered strawberries." One or more dataset entries matching the top level n-gram can be returned. As used herein, a dataset entry matching a queried n-gram refers to a dataset entry associated with a title containing all or part of the queried n-gram. Continuing with the above example, the query module can receive the dataset entries "Chocolate covered strawberry", "Chocolate-covered fruit", and "Chocolate strawberries" from the linked dataset.

In the event that no dataset entries are returned in response to a query with a top-level n-gram, the query module 602 queries the linked dataset 610 with a potential noun phrase n-gram from the second level of n-gram hierarchy, representing the second least noun phrase ambiguity. Continuing with the above example, the query module queries the linked dataset with the n-grams "chocolate covered" and "covered strawberries". One or more dataset entries matching the second level n-gram can be returned. Alternatively, if no dataset entries matching the queried second level n-grams are returned, the query module can query the linked dataset with a potential noun phrase n-gram from the next level of n-gram hierarchy (such as "chocolate", "covered", and "strawberries" in the previous example). The query module queries the linked dataset with progressively lower hierarchy level n-grams until the linked dataset returns a set of entries matching the queried n-grams.

It should be noted that all n-grams at an n-gram hierarchy level are used by the query module 602 to query the linked dataset 610 when the query module queries the linked dataset at a particular hierarchy level. Accordingly, the query results can include dataset entries associated with each of the n-grams at a particular hierarchy level. In the event that the linked dataset does not return dataset entries associated with any queried n-grams at any hierarchy level, the query module can query the linked dataset 610 using n-grams from phonetic equivalents of potential noun phrases. For example, the query module can identify alternative or equivalent potential noun phrase terms, tenses, forms, and punctuation (such as common misspellings, present tenses, and the like). In such instances, the query module queries the linked dataset with successively more ambiguous n-grams within an n-gram hierarchy from the phonetically-equivalent potential noun phrases, and a set of dataset entries associated with the queried phonetically-equivalent n-grams can be returned. In the event that no dataset entries are returned in response even to the queried phonetically-equivalent n-grams, the evaluate module 608 determines that the potential noun phrase does not include an entity, and the potential noun phrase is identified as a key phrase.

The parse module 604 parses the returned set of dataset entries to the dataset entries returned from the linked dataset 610 that most closely match the queried n-grams. The parse module first determines whether any returned dataset entries are a case-sensitive match to a queried n-gram. For example, if the query module 602 queries the linked dataset with "Chocolate", "covered", and "strawberry", the returned dataset entry "Chocolate" is identified as a case-sensitive match, while the returned dataset entries "Cover" and "Strawberry" is not identified as case-sensitive matches. The parse module parses the set of dataset entries to any dataset entries determined to be case-sensitive matches to a queried n-gram, and passes the parsed set of dataset entries to the score module 606 for scoring.

In the event that none of the returned dataset entries are case-sensitive matches with a queried n-gram, the parse module 604 determines whether any returned dataset entries are case-insensitive matches to a queried n-gram. Continuing with the previous example, both "Chocolate" and "Strawberry" are identified as case-insensitive matches to queried n-grams, and "Cover" is not. The parse module parses the set of dataset entries to entries that are case-insensitive matches for scoring by the score module 606. In the event that none of the returned dataset entries are case-insensitive matches with a queried n-gram, the parse module determines whether any data entries are phonetic matches to a queried n-gram. Continuing with the previous example, "Chocolate", "Cover", and "Strawberry" are identified as phonetic matches with a queried n-gram, and the parse module parses the set of dataset entries to entries that are phonetic matches for scoring by the score module.

It should be noted that in one embodiment, if the parse module 604 identifies at least one dataset entry as a case-sensitive match to a queried n-gram, the parse module does not determine whether any dataset entries are case-insensitive matches or phonetic matches. Similarly, if the parse module determines that no dataset entries are case-sensitive matches but that at least one dataset entry is a case-insensitive match, the parse module does not determine whether any dataset entries are phonetic matches. In other words, the parse module parses the returned dataset entries to the entries that match a queried n-gram as unambiguously as possible.

The score module 606 determines a clarity score for each entry in the set of parsed entries received from the parse module 604. The clarity score represents the ambiguity of each entry in the set of parsed entries, with a higher clarity score correlating to a lower ambiguity and vice versa. Factors used to determine a clarity score for a target dataset entry include but are not limited to one or more of:

- Cross-match between the target entry and previously identified entities (for example, the number of common tokens or words within text of the target entry and text within previously identified entities and associated dataset entries)
- The popularity of the target entry within the linked dataset (for instance, how often the target entry is trafficked by users of the linked dataset relative to other entries)
- The number of links to other dataset entries within the target entry and/or the number of links within other dataset entries to the target entry
- The size of the target entry (such as the word count of the target entry)

Other factors that may be used to determine clarity scores include the position of the target entry within a linked dataset hierarchy, the number of queried n-grams found within text of the target entry, and any other factor associated with the target entry.

The evaluate module 608 receives the parsed set of dataset entries and associated clarity scores and evaluates the parsed set of data entries to determine which, if any, of the entries qualify as entities. In one embodiment, the evaluate module only evaluates the dataset entry associated with the highest clarity score, though in other embodiments, all dataset entries, or all dataset entries associated with an above-threshold clarity score, are evaluated.

To evaluate a dataset entry, the evaluate module 608 determines an entity score for each dataset entry representing the likelihood that the entry is a disambiguated entity. In one embodiment, the evaluate module determines an entity score for each dataset entry by classifying the dataset entry with a classifier configured to produce an entity score based on characteristics of the dataset entry. Such a classifier can be trained with training sets of conversation data including manually-identified entities. An entity score for a target dataset entry can be based on, for example, one or more of the following:

- Any of the factors described above for determining a clarity score for the target entry
- The clarity score of the target entry
- The type of match between the target entry and a queried n-gram (e.g., whether the parse module determines that the target entry is a case-sensitive match with a queried n-gram, a case-insensitive match, or a phonetic match)
- The number of words in the queried n-gram resulting in the return of the target entry by from the linked dataset The evaluate module 608 determines whether entries in the parsed set of dataset entries are entities based on the determined entity scores for the dataset entries. In one embodiment, the evaluate module determines that any entry associated with an entity score that exceeds a pre-determined threshold is an entity. Alternatively, the evaluate module determines that the entry associated with the highest entity score is an entity if the highest entity score exceeds a pre-determined threshold. The pre-determined threshold used by the evaluate model to compare entity scores against can be determined based on training sets of conversation data, and can be set such that a threshold percentage of entities within the training sets of conversation data are identified.

Figure 7:
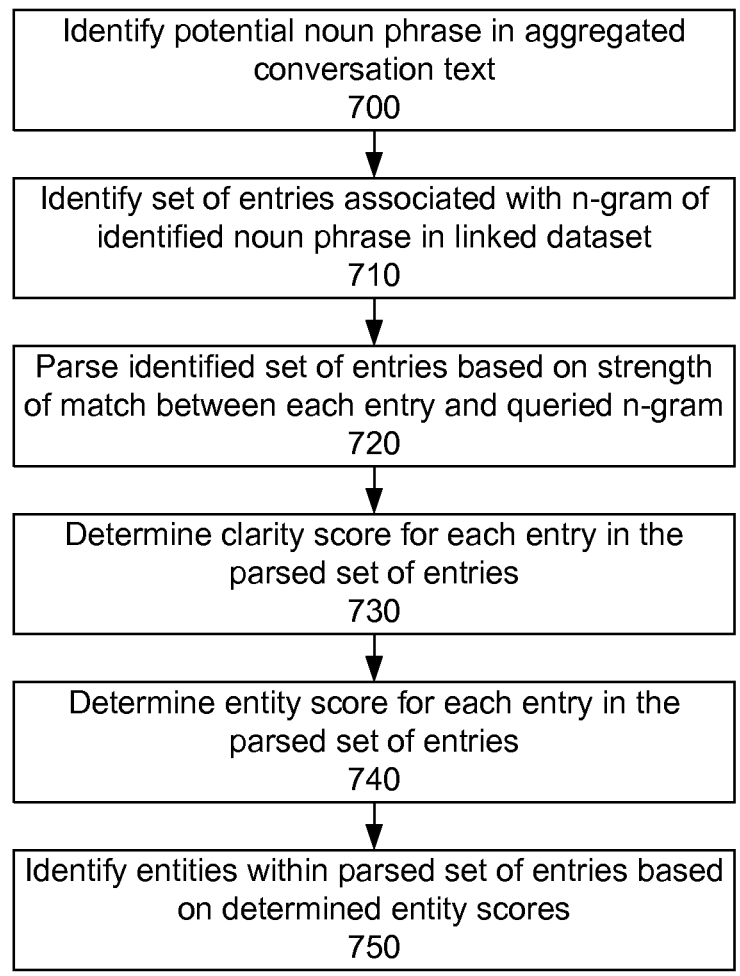
FIG. 7 is a flow chart illustrating a process for identifying an entity within conversation text, according to one embodiment.

FIG. 7 is a flow chart illustrating a process for identifying an entity within conversation text, according to one embodiment. A potential noun phrase is identified 700 within aggregated conversation text. The potential noun phrase can be identified using, for example, a PoS tagging system or software. A set of dataset entries associated with an n-gram of the potential noun phrase are identified 710 within a linked dataset. The linked dataset includes dataset entries that can contain links to other dataset entries, and can be populated with various databases, directories, online data sources, and the like. Dataset entries can be identified by querying the linked dataset with n-gram components of the potential noun phrase.

The set of dataset entries is parsed 720 based on a strength of match or measure of similarity between each dataset entry and a queried n-gram. For instance, a match between a dataset entry and a queried n-gram can be a case-sensitive match, a case-insensitive match, and a phonetic match. A clarity score is determined 730 for each entry in the parsed set of entries, based on, for example, the contents, popularity, and size of each entry. An entity score is determined 740 for each entry in the parsed set of entries based on, for example, the clarity score associated with each entry, the type of match between each entry and a queried n-gram, and the number of words in the queried n-gram. In one embodiment, entities scores are only determined for the dataset entry associated with the highest clarity score, or for dataset entries associated with above-threshold clarity scores. Dataset entries are identified 750 as entities based on the determined entity scores. For example, any dataset entry associated with an above-threshold entity score is identified as an entity.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a conversation system than described herein. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method for generating a conversation model representative of a state of a conversation between a plurality of participants, comprising:

retrieving, by a computer, conversation text associated with the conversation, the conversation associated with a conversation interface accessible to the plurality of participants and displayed by a hardware client device of each participant, the conversation interface displaying content associated with the conversation;

identifying, by the computer, a plurality of conversation model components representative of the conversation within the conversation text, each conversation model component associated with a timestamp representative of a time within the conversation in which the conversation text associated with the conversation model component occurs;

determining correlation scores between pairs of conversation model components, wherein a correlation score represents a measure of relatedness between a pair of model components;

querying a document corpus with one or more identified conversation model components associated with timestamps that occurred within an interval of time temporally adjacent to a time of querying the document corpus to identify candidate components included within the document corpus that are associated with the one or more identified conversation model components, the identified candidate components comprising key phrases or entities;

identifying, by the computer, extrapolated conversation model components representative of the conversation based on the plurality of conversation model components and the determined correlation scores, each extrapolated conversation model component selected from the identified candidate components included within the document corpus;

storing, by the computer, the plurality of conversation model components, the extrapolated conversation model components, and the correlation scores as a conversation model within a non-transitory computer-readable storage medium;

retrieving additional content based at least in part on the extrapolated conversation model components; and updating the conversation interface displayed by each hardware client device to additionally display the retrieved additional content.

2. The method of claim 1, wherein identifying a plurality of conversation model components comprises:

identifying one or more text transcripts within the conversation text; and determining a relevance score for each of one or more text transcripts representing the relevance of the text transcript to the conversation.

3. The method of claim 2, wherein determining a relevance score for a text transcript comprises:

querying a document index with the text transcript to identify documents including one or more terms of the text transcript;

identifying a set of result components from the identified documents, each result component including data associated with the identified documents;

generating a transcript vector including the identified set of result components, each transcript vector entry including a result component and a count represent a number of occurrences of the result component within the identified documents;

classifying the transcript vector with a transcript classifier trained to produce a relevance score.

4. The method of claim 1, wherein identifying a plurality of conversation model components comprises:

identifying one or more entities within the conversation text;

identifying one or more key phrases within the conversation text; and determining a relevance score for each of one or more entities and key phrases representing the relevance of the entity or key phrase to the conversation.

5. The method of claim 4, wherein determining a relevance score for an entity or key phrase comprises:

querying a document index with the entity or key phrase to identify documents including one or more terms of the entity or key phrase;

identifying a set of result components from the identified documents, each result component including data associated with the identified documents;

generating a vector including the identified set of result components, each vector entry including a result component and a count represent a number of occurrences of the result component within the identified documents;

classifying the vector with a classifier trained to produce a relevance score.

6. The method of claim 1, wherein determining a correlation score for a pair of model components comprises:

determining a component vector for each model component in the pair, a component vector entry including data associated with a document identified as including one or more terms associated with the model component;

determining a cross-match score for the pair of model components based on the component vectors associated with the components;

determining an intersection score for the pair of model components based on a number of component vector entries the pair of model components have in common; and determining the correlation score for the pair of model components based on the determined cross-match score and the determined intersection score.

7. The method of claim 1, wherein identifying an extrapolated conversation model component comprises:

identifying a pair of model components;

accessing the determined correlation score for the identified pair of model components; and combining the pair of model components to form an extrapolated conversation model component if the accessed correlation score exceeds a pre-determined threshold.

8. A non-transitory computer-readable storage medium storing executable computer program instructions for generating a conversation model representative of a state of a conversation between a plurality of participants, the instructions performing steps comprising:

retrieving conversation text associated with the conversation, the conversation associated with a conversation interface accessible to the plurality of participants and displayed by a hardware client device of each participant, the conversation interface displaying content associated with the conversation;

identifying a plurality of conversation model components representative of the conversation within the conversation text, each conversation model component associated with a timestamp representative of a time within the conversation in which the conversation text associated with the conversation model component occurs;

determining correlation scores between pairs of conversation model components, wherein a correlation score represents a measure of relatedness between a pair of model components;

querying a document corpus with one or more identified conversation model components associated with timestamps that occurred within an interval of time temporally adjacent to a time of querying the document corpus to identify candidate components included within the document corpus that are associated with the one or more identified conversation model components, the identified candidate components comprising key phrases or entities;

identifying extrapolated conversation model components representative of the conversation based on the plurality of conversation model components and the determined correlation scores, each extrapolated conversation model component selected from the identified candidate components included within the document corpus;

storing the plurality of conversation model components, the extrapolated conversation model components, and the correlation scores as a conversation model within a memory;

retrieving additional content based at least in part on the extrapolated conversation model components; and updating the conversation interface displayed by each hardware client device to additionally display the retrieved additional content.

9. The computer-readable storage medium of claim 8, wherein identifying a plurality of conversation model components comprises:

identifying one or more text transcripts within the conversation text; and determining a relevance score for each of one or more text transcripts representing the relevance of the text transcript to the conversation.

10. The computer-readable storage medium of claim 9, wherein determining a relevance score for a text transcript comprises:

querying a document index with the text transcript to identify documents including one or more terms of the text transcript;

identifying a set of result components from the identified documents, each result component including data associated with the identified documents;

generating a transcript vector including the identified set of result components, each transcript vector entry including a result component and a count represent a number of occurrences of the result component within the identified documents;

classifying the transcript vector with a transcript classifier trained to produce a relevance score.

11. The computer-readable storage medium of claim 8, wherein identifying a plurality of conversation model components comprises:

identifying one or more entities within the conversation text;

identifying one or more key phrases within the conversation text; and determining a relevance score for each of one or more entities and key phrases representing the relevance of the entity or key phrase to the conversation.

12. The computer-readable storage medium of claim 11, wherein determining a relevance score for an entity or key phrase comprises:

querying a document index with the entity or key phrase to identify documents including one or more terms of the entity or key phrase;

identifying a set of result components from the identified documents, each result component including data associated with the identified documents;

generating a vector including the identified set of result components, each vector entry including a result component and a count represent a number of occurrences of the result component within the identified documents;

classifying the vector with a classifier trained to produce a relevance score.

13. The computer-readable storage medium of claim 8, wherein determining a correlation score for a pair of model components comprises:

determining a component vector for each model component in the pair, a component vector entry including data associated with a document identified as including one or more terms associated with the model component;

determining a cross-match score for the pair of model components based on the component vectors associated with the components;

determining an intersection score for the pair of model components based on a number of component vector entries the pair of model components have in common; and determining the correlation score for the pair of model components based on the determined cross-match score and the determined intersection score.

14. A computer system for generating a conversation model representative of a state of a conversation between a plurality of participants, comprising:

a non-transitory computer readable storage medium storing executable computer program instructions comprising instructions for:

retrieving conversation text associated with the conversation, the conversation associated with a conversation interface accessible to the plurality of participants and displayed by a hardware client device of each participant, the conversation interface displaying content associated with the conversation;

identifying a plurality of conversation model components representative of the conversation within the conversation text, each conversation model component associated with a timestamp representative of a time within the conversation in which the conversation text associated with the conversation model component occurs;

determining correlation scores between pairs of conversation model components, wherein a correlation score represents a measure of relatedness between a pair of model components;

querying a document corpus with one or more identified conversation model components associated with timestamps that occurred within an interval of time temporally adjacent to a time of querying the document corpus to identify candidate components included within the document corpus that are associated with the one or more identified conversation model components, the identified candidate components comprising key phrases or entities;

identifying extrapolated conversation model components based on the plurality of conversation model components and the determined correlation scores, each extrapolated conversation model component selected from the identified candidate components included within the document corpus;

storing the plurality of conversation model components, the extrapolated conversation model components, and the correlation scores as a conversation model;

retrieving additional content based at least in part on the extrapolated conversation model components;

updating the conversation interface displayed by each hardware client device to additionally display the retrieved additional content;

a processor for executing the computer program instructions.

15. The computer system of claim 14, wherein identifying a plurality of conversation model components comprises:
- identifying one or more text transcripts within the conversation text; and
- determining a relevance score for each of one or more text transcripts representing the relevance of the text transcript to the conversation.

16. The computer system of claim 15, wherein determining a relevance score for a text transcript comprises:
- querying a document index with the text transcript to identify documents including one or more terms of the text transcript;
- identifying a set of result components from the identified documents, each result component including data associated with the identified documents;
- generating a transcript vector including the identified set of result components, each transcript vector entry including a result component and a count represent a number of occurrences of the result component within the identified documents;
- classifying the transcript vector with a transcript classifier trained to produce a relevance score.

17. The computer system of claim 14, wherein identifying a plurality of conversation model components comprises:
- identifying one or more entities within the conversation text;
- identifying one or more key phrases within the conversation text; and
- determining a relevance score for each of one or more entities and key phrases representing the relevance of the entity or key phrase to the conversation.

18. The computer system of claim 17, wherein determining a relevance score for an entity or key phrase comprises:
- querying a document index with the entity or key phrase to identify documents including one or more terms of the entity or key phrase;
- identifying a set of result components from the identified documents, each result component including data associated with the identified documents;
- generating a vector including the identified set of result components, each vector entry including a result component and a count represent a number of occurrences of the result component within the identified documents;
- classifying the vector with a classifier trained to produce a relevance score.

19. The computer system of claim 14, wherein determining a correlation score for a pair of model components comprises:
- determining a component vector for each model component in the pair, a component vector entry including data associated with a document identified as including one or more terms associated with the model component;
- determining a cross-match score for the pair of model components based on the component vectors associated with the components;
- determining an intersection score for the pair of model components based on a number of component vector entries the pair of model components have in common; and
- determining the correlation score for the pair of model components based on the determined cross-match score and the determined intersection score.

20. The computer system of claim 14, wherein identifying an extrapolated conversation model component comprises:
- identifying a pair of model components;
- accessing the determined correlation score between the identified pair of model components; and
- combining the pair of model components to form an extrapolated conversation model component if the accessed correlation score exceeds a pre-determined threshold.

21. The method of claim 1, further comprising:
- retrieving additional conversation text associated with the conversation;
- identifying, by the computer, a plurality of additional conversation model components representative of the conversation within the additional conversation text;
- updating the stored correlation scores between pairs of conversation model components based on the plurality of additional conversation model components within the additional conversation text.

* * * * *